United States Patent [19]

Tatch

[11] 4,326,728
[45] Apr. 27, 1982

[54] FAIRING FOR GROUND-TRAVELLING VEHICLE

[76] Inventor: Fred G. Tatch, 3145 Onyx St., Eugene, Oreg. 97405

[21] Appl. No.: 145,577

[22] Filed: Apr. 30, 1980

[51] Int. Cl.³ .............................................. B62J 17/00
[52] U.S. Cl. ................... 280/289 S; 296/78.1
[58] Field of Search ................... 296/78.1; 280/289 S, 280/289 G; 267/150

[56] References Cited

U.S. PATENT DOCUMENTS

| | | | |
|---|---|---|---|
| 1,135,337 | 4/1915 | Bunau-Varilla | 296/78.1 |
| 1,356,874 | 10/1920 | Moran | 296/78.1 |
| 2,160,546 | 5/1939 | Hurtado | 296/78.1 |
| 2,756,610 | 7/1956 | Hibbard | 267/150 |
| 2,761,689 | 9/1956 | Becker | 296/78.1 |
| 3,979,147 | 9/1976 | Kelley | 296/78.1 |
| 3,984,142 | 10/1976 | Van Valkenburgh | 296/78.1 |
| 4,045,077 | 8/1977 | DeVone | 296/78.1 |
| 4,157,739 | 6/1979 | Frye | 296/78.1 |

*Primary Examiner*—Joseph F. Peters, Jr.
*Assistant Examiner*—John A. Carroll
*Attorney, Agent, or Firm*—Kolisch, Hartwell & Dickinson

[57] ABSTRACT

Apparatus for enhancing the aerodynamic travel capability of a ground-travelling vehicle having a frame. Anchor means are attached to the frame. An aerodynamic fairing surrounds the frame and is attached to the anchor means with biasing means. The biasing means are arranged to create a generally upright vertical pivot axis about which the fairing can pivot within predetermined limits.

5 Claims, 3 Drawing Figures

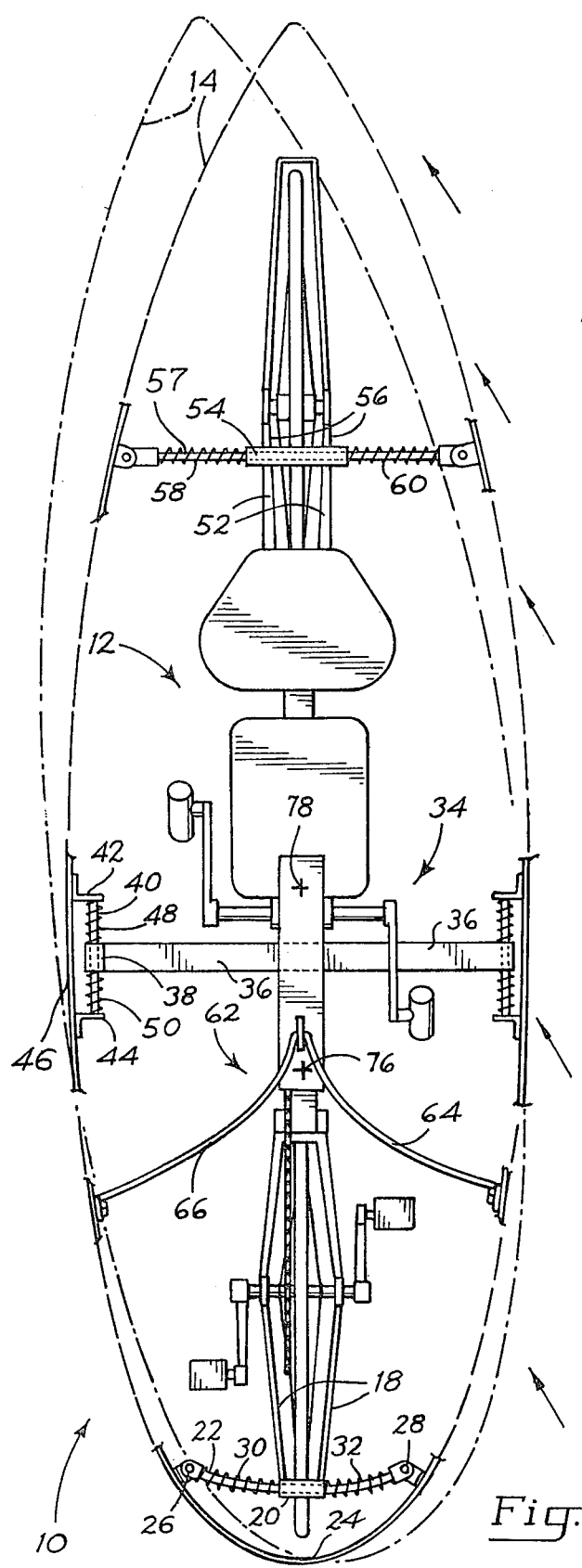
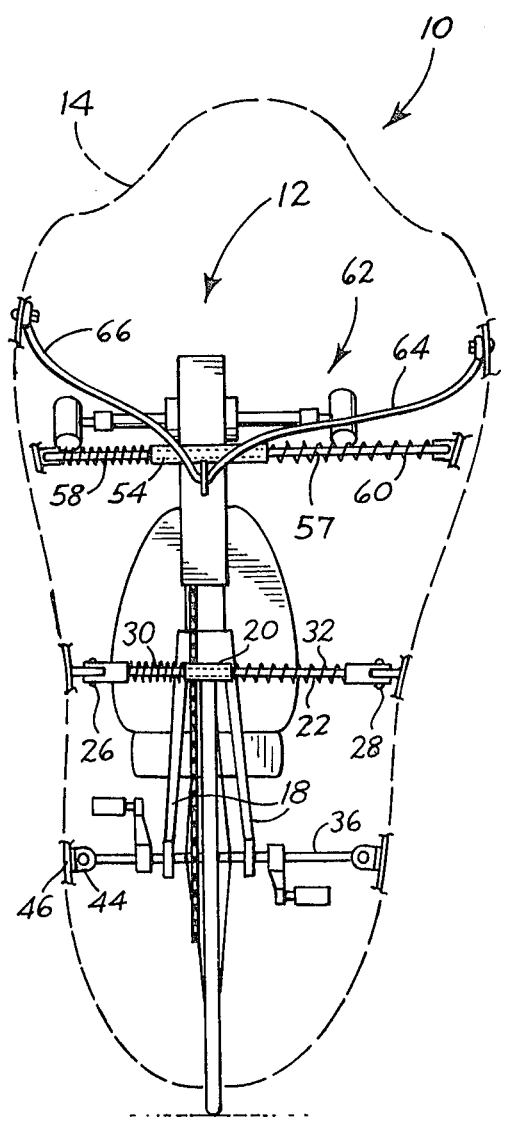
Fig. 2.
Fig. 3.

FAIRING FOR GROUND-TRAVELLING VEHICLE

BACKGROUND AND SUMMARY

This invention pertains to aerodynamic fairings for ground-travelling vehicles. More particularly, the invention pertains to such fairings which are movable with respect to the vehicle frame to which they are attached.

The usual fairing for a ground-travelling vehicle includes a lightweight air foil, such being aerodynamically shaped to minimize air resistance when the fairing is in motion. Typically, the fairing is rigidly mounted to the vehicle so that little or no movement of the fairing with respect to the vehicle frame is possible. A fairing so mounted reduces the wind resistance of a moving vehicle compared to that of a vehicle without the fairing. However, problems arise when the vehicle-fairing combination encounters crosswinds and winds approaching the fairing at different angles from the front. Such winds apply force to the fairing which is transmitted to the frame, requiring an increase in the power necessary to drive the vehicle.

A general object of the present invention is to provide an aerodynamic fairing for a vehicle which shifts its position with respect to the vehicle frame in response to crosswinds and headwinds and thus minimizes the fairing surface area presented to the wind.

The instant embodiment of the invention is adopted for use with a bicycle. About ⅓ of the distance along the longitudinal axis of the bicycle frame, rigid members are attached thereto, such extending laterally from the frame on either side thereof. An aerodynamic fairing is provided which fits over the bicycle and is connected to the end of each member. Such connection includes a spring interposed between the fairing and the member, which urges the fairing into a position of alignment with the bicycle frame, yet permits movement of the fairing relative to the frame in response to a force applied to the fairing. Somewhat similar connections are provided at the front and rear of the bicycle, such also including springs which urge the fairing into alignment with the bicycle frame yet permit movement as above-described.

Another object of the instant invention is to provide a method of attaching a fairing to a ground-travelling vehicle which permits the fairing to turn in the direction of a headwind, thus creating a pressure differential on either side of the fairing which provides a force in the direction of travel of the vehicle.

A more specific object of the instant invention is to provide such a fairing which is responsive to both turning and leaning of the vehicle to which it is attached, thus reducing air resistance in turns and enhancing operation of the vehicle in crosswinds.

These and other advantages and objectives of the instant invention will become more fully apparent as the description which follows is read in conjunction with the accompanying drawings.

DESCRIPTION OF THE DRAWINGS

FIG. 2 is a view taken along line 2—2 in FIG. 1.

FIG. 3 is a view taken along lines 3—3 in FIG. 1.

DETAILED DESCRIPTION

Figure 1:
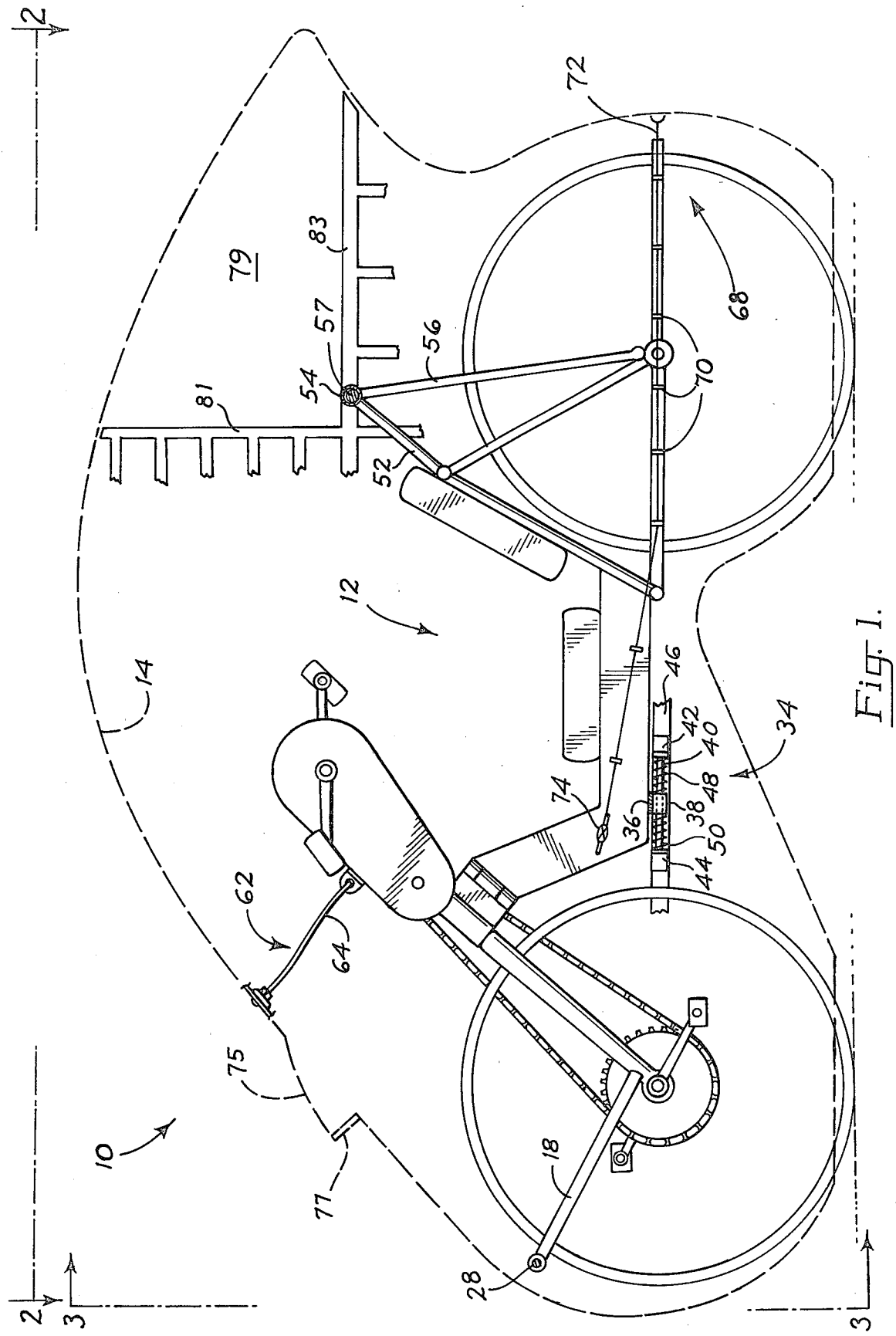
FIG. 1 is a side view of a bicycle and fairing including apparatus constructed in accordance with the instant invention.

Turning first to FIG. 1, indicated generally at 10 is a fairing-bicycle combination including apparatus constructed in accordance with the present invention. A bicycle 12 is adapted for use with the instant embodiment of the invention, bicycle 12 being of a somewhat different construction than the typical bicycle. Bicycle 12 is constructed in accordance with the teachings of U.S. Pat. No. 3,910,599. It is to be appreciated that the instant embodiment of the invention can be adapted for use with any type of ground-travelling vehicle whether or not such is man powered. A fairing 14 is illustrated somewhat schematically with dashed lines being used to illustrate the boundaries of the fairing. The fairing is constructed of a lightweight framework (shown only in parts) and has a thin, transparent plastic sheeting (not shown), like mylar, stretched thereover. The outer dimensions of the framework can be determined by examination of the fairing boundaries in each of the three figures, such boundaries indicating the fairing shape. A removable panel (not shown) is provided in the side of the fairing to permit access by a rider to bicycle 12.

Generally speaking, when a rider is riding bicycle 12, fairing 14 provides a decrease in the wind resistance compared to riding the bicycle without the fairing. As will become more fully apparent, fairing 14 is attached to bicycle 12 in such a manner as to permit relative movement between the fairing and the bicycle frame, such movement providing an aerodynamic advantage during the riding of bicycle 12.

Turning now to FIGS. 2 and 3, examination will now be made of the means by which the fairing is attached to the bicycle frame. A fork pair 18 is fixedly mounted on the bicycle frame at one end and has a cylindrical guide 20 attached to the other end. Fork pair 18 and guide 20 are referred to herein as anchor means. Guide 20 has a bore extending along its axis to permit rod 22 to pass therethrough. Rod 22 is circular in cross-section and is pivotally attached to fairing framework 24 at points 26, 28. Helical springs 30, 32, also referred to herein as biasing means, are compressed between either end of guide 20 and their respective attachment points 26, 28. The springs are trained over rod 22 along their axes.

Another point of connection between the bicycle frame and the fairing occurs about ⅓ of the distance along the axis of the bicycle frame, indicated generally at 34. A rigid member 36 is attached to the underside of the bicycle frame as by welding. At one end of member 36 is a crylindrical guide 38. Guide 38 is of a similar construction to guide 20 at the front of the fairing although guide 38 is somewhat shorter than guide 20. Member 36 and guide 38 are also referred to as anchor means. A rod 40 passes through the bore in guide 38 and is fixedly attached to brackets 42, 44, such being mounted on fairing framework 46. Helical springs 48, 50, (or biasing means) are compressed between either end of guide 38 and brackets 42, 44, respectively. Rod 40 rests within guide 38 and thus supports the fairing in cooperation with the other rods and guides. It should be noted that the bore within all of the guides is of a sufficiently large size to allow the axis of its associated rod to pivot away from the bore axis. In other words, with the rod inserted into the guide, pivotal movement of the rod, with such pivoting being about a point at the center of the guide, is possible.

As can be seen from the illustration in FIG. 2, the other connection between member 36 and the fairing is of the same construction as that occurring between member 36 and fairing framework 46 and thus no additional description is required.

Another point of attachment between the bicycle frame and the fairing occurs toward the rear of the frame. Fork pair 52 is attached as by welding to the bicycle frame at one end and is attached to a cylindrical guide 54, also as by welding, at its other end. Fork pair 56 is attached to the bicycle frame near the hub of the rear wheel at one end, its other end being fixedly attached as by welding to guide 54. Fork pairs 52, 56 and guide 54 taken together are also called anchor means herein. FIG. 1 illustrates the points of attachment of fork pairs 52, 56 and of their orientation with respect to guide 54. Returning again to FIG. 2, a rod 57 passes through guide 54 and is pivotally secured to the fairing framework as shown. Helical springs 58, 60 are interposed between guide 54 and its attachment points to the fairing. Thus, the biasing action of springs 58, 60 tends to align the longitudinal axes of the bicycle frame and the fairing.

The remaining connection between the bike frame and the fairing, in the instant embodiment of the invention, is a spring steel support indicated generally at 62. Support 62 includes two spring steel arms 64, 66 each being fixedly attached to the bicycle frame (perhaps best seen in FIG. 2) at one end and secured, as by bolting, to the fairing framework at its other end. Arms 64, 66 are made of spring steel and have a flexible quality to them yet are sufficiently rigid to provide support for fairing 14.

Turning to FIG. 1, indicated generally at 68 is what is referred to herein as adjustable limit means. Included within limit means 68 is a plurality of eyelets 70, such being attached to the frame of the bicycle. Attached to the rear of the fairing is a cord 72. The attachment point of cord 72 to the fairing is just opposite an eyelet on the bicycle frame. Cord 72 runs through the eyelets as shown in FIG. 1, and is secured, with a selected amount of slack, to a cleat 74. The functioning of limit means 68 will be hereinafter more fully described.

Forming a portion of fairing 14 at the front thereof is an air scoop 75, also referred to herein as air intake means. When the bicycle-fairing combination is in motion, air is forced into an opening 77 formed by the air scoop. Air passes through opening 77 and into the fairing interior, thus slightly elevating the pressure inside the fairing. Included within fairing 14 is a rear portion 79. Portion 79 is made up of the same clear material which covers the fairing framework. However, the fairing framework does not extend rearwardly from frame 81 nor above framework 83. Accordingly, portion 79, when the vehicle is not in motion, is simply a loose portion of the fairing material unsupported by framework. When the vehicle is in motion and the interior is pressurized as above described, portion 79 extends to the rear and assumes the shape illustrated in FIG. 1. The dashed line boundary of portion 79 is intended to illustrate its pressurized position. Portion 79 is provided to allow the fairing to absorb a sudden gust of wind, such being absorbed by portion 79 essentially collapsing. Such a gust might occur, by way of example, if a large truck were to pass the bicycle-fairing combination on a roadway. Were portion 79 supported by framework, like the remainder of the fairing, the gust so occuring might throw bicycle 12 off course or perhaps tip it over. Instead, the force of the gust is dissipated by portion 79 collapsing within the interior of fairing 14. As soon as the gust has passed, air forced in through opening 77 again pressurizes the fairing interior and portion 79 resumes the shape illustrated in FIG. 1.

Consideration will now be given to the movement of fairing 14 with respect to the bicycle frame and the aerodynamic benefits of such movement when the bicycle is in motion. In the embodiment illustrated herein, the attachment points between the bicycle frame and the fairing are arranged so that when force is applied to the fairing as a result of a crosswind or a headwind (from a direction other than straight on), the fairing tends to pivot about a generally upright pivot axis located at point 76. Pivot axis 76 may be located anywhere along the longitudinal axis of the bicycle frame so long as it remains in front of what is referred to herein as the aerodynamic center of force, such being indicated at point 78. The aerodynamic center of force as used herein refers to an imaginary upright pivot axis located along the longitudinal axis of the fairing. The shape of a fairing determines the location of its aerodynamic center of force. The center of force is the point at which the fairing could be suspended on a vertical upright pivot axis without any movement at all in the presence of a uniformly distributed crosswind blowing at right angles to its longitudinal axis. If the fairing were suspended either forwardly or rearwardly of point 78, it would tend to rotate in the presence of such a crosswind. Since the fairing of FIG. 2 is mounted according to the instant invention, in the presence of crosswinds or headwinds from all directions, the fairing tends to point into the wind.

Assuming now that the bicycle-fairing combination is driving forward along the longitudinal axis of bicycle 12 in FIG. 2. When no wind is present, the longitudinal axis of the fairing and the bicycle are in line as shown by the dashed outline of fairing 14. If, for example, a headwind blows into the fairing in the direction of the arrows along the right hand side of the fairing, the fairing tends to pivot to the position shown by the dot-dash fairing outline. This pivoting occurs about point 76. If point 76 were to the rear of aerodynamic center 78, fairing 14 would tend to pivot in the direction opposite of that illustrated in FIG. 2, resulting in the presentation of an increased surface area to the crosswind with resultant adverse affects on the forward progress of the bicycle.

With the fairing pivoted as shown in FIG. 2, two beneficial aerodynamic results occur. First, less surface area is presented to the headwind than if the fairing remained in the dashed configuration of FIG. 2. When less surface area is presented to a headwind, less drag is generated as a result. This effect is referred to herein as "weather vaning". Secondly, when a crosswind hits the dot-dash fairing as shown in FIG. 2, the fairing pivots as shown and a high-pressure area is generated along the side of the fairing facing generally the direction of the wind. A low-pressure area is generated along the opposite side. This produces a pressure differential between one side of the fairing and the other, the high-pressure side being more toward the rear of the bicycle (due to fairing pivot) and the low-pressure area being more toward the front. Such a differential generates a force acting on the fairing, which force has a component in the direction of travel of the bicycle. This action is referred to herein as a "sailing effect" and is the same action which permits a sail boat to sail into a headwind.

As will be recalled, in order to generate the sailing and weather vaning effects, the pivot axis, represented in the instant embodiment by point 76, must be in front of the aerodynamic center of force, point 78 herein. Selection of the location of point 76 is determined by the arrangement of the springs between the fairing and the frame. As can be seen in FIG. 2, if fork pair 18, guide 20, rod 22 and attachment points 26, 28 were moved toward the rear of fairing 14, point 76 likewise would shift rearwardly.

FIG. 3 illustrates the action of fairing 14 with respect to the bicycle frame in the presence of a crosswind directed into the left hand side of the fairing. As can be seen, the bicycle is tilted slightly to the left to counterbalance the force of the crosswind. Additionally, spring 58 is compressed also exerting a force on the fairing against the crosswind. Spring 30 likewise produces such a force although not to the extent of spring 58, since spring 58 is at a higher level and is compressed more for a given amount of bicycle lean. Such construction permits a rider of the bicycle to travel in the presence of a crosswind in a more generally upright position than a rider so travelling on a bicycle having a fixed fairing.

When turning the bicycle, collar 20 tends to compress either spring 30 or spring 32, depending upon the direction of the turn, so that the fairing pivots slightly to permit the fairing to point into the turn. This construction tends to keep the fairing pointed in the direction of travel, thus minimizing the surface area of the fairing presented to the direction of the travel and thereby reducing drag. As soon as the turn is completed, the springs tend to realign the longitudinal axis of the fairing with the longitudinal axis of the bicycle (assuming an absence of wind).

Limit means 68 is provided so that a rider of bicycle 12 may apply tension to cord 72 and maintain the tension by wrapping the cord around cleat 74. By so doing, the normal pivoting action of the fairing is inhibited. This may be desirable when riding the bicycle-fairing combination in the presence of a strong tailwind. The amount of slack in cord 70 determines the degree to which pivotal motion of the fairing is limited. A large amount of slack permits the rear of the fairing a broader range of movement and thus allows more pivoting. When cord 72 is under tension, virtually no pivotal motion is allows.

Thus, a new and improved apparatus for mounting a fairing has been presented, such enhancing the aerodynamic qualities of the fairing by permitting movement thereof with respect to the frame of the vehicle over which the fairing sits.

While a preferred embodiment of the invention has been described, it is appreciated that variations and modifications may be made without departing from the spirit of the invention.

It is claimed and desired to secure by Letters Patent:

1. Aerodynamic fairing apparatus for use on a ground-travelling vehicle such as a bicycle and the like having an elongate frame, said apparatus comprising
  an elongate fairing including a framework encompassing side and top portions of the vehicle, said fairing having an upright aerodynamic center of force axis between front and rear ends of the fairing,
  mounting means mounting said framework on the vehicle frame for pivoting thereon about a substantially upright axis positioned forwardly with respect to said center of force axis, and
  biasing means interposed between said framework and the vehicle frame to urge the fairing yieldably toward a position of longitudinal alignment with the vehicle frame.

2. The apparatus of claim 1, wherein said mounting means includes anchor means mounted rigidly on said frame and means moveably joining opposed sides of said fairing to said anchor means, and said biasing means includes spring means interposed between said anchor means and said joining means.

3. The apparatus of claim 1, wherein said mounting means includes forward and rear mounting structures mounted on forward and rear end portions of said fairing on the vehicle frame for movement in directions which are substantially lateral with respect to the fairing's longitudinal axis, and intermediate mounting structure mounted on an intermediate portion of said fairing moveably on the vehicle structure.

4. The apparatus of claim 1, wherein said fairing further includes a shell-like air foil on said framework, and said foil includes an air-pressure-supported rear portion and an air-intake opening through which the fairing interior is adapted to be pressurized, thereby to support said rear portion during vehicle travel.

5. An aerodynamic ground-travelling vehicle comprising
  a ground-travelling, elongate vehicular frame,
  an elongate fairing having a framework which encompasses side and top portions of said frame, said fairing having an upright aerodynamic center of force axis,
  means mounting said framework on said frame for pivoting thereon about a substantially upright axis positioned forwardly with respect to said center of force axis, and
  biasing means interposed between said framework and said frame to urge said framework yieldably toward a position of longitudinal alignment with said frame.

* * * * *